May 18, 1965
A. D. BARNETT ETAL
3,184,040
TAKE-OFF MACHINES
Filed Jan. 7, 1963
3 Sheets-Sheet 2
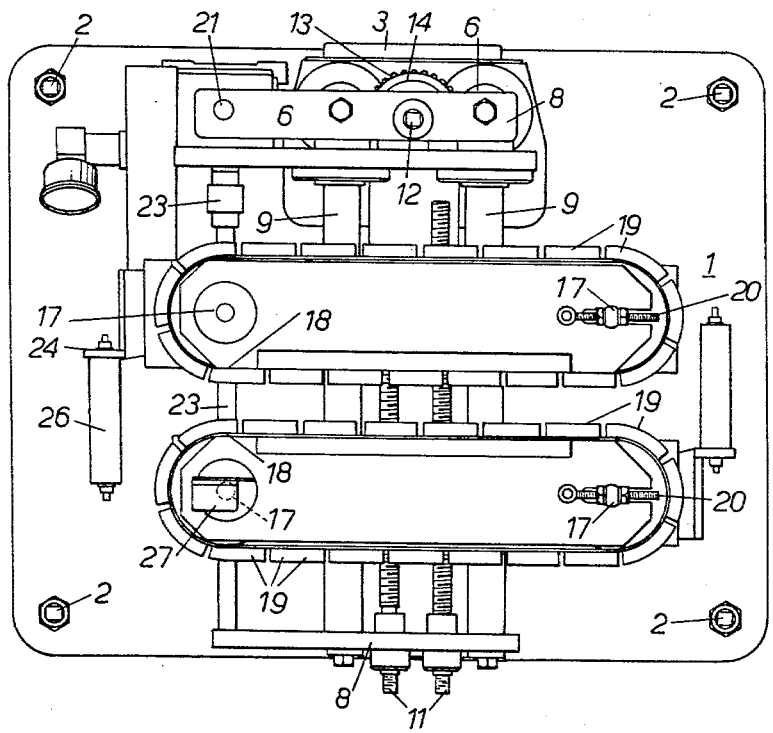
- FIG. 2.-
INVENTOR:
ALVIN DEXTER BARNETT
BY Abraham A. Saffitz
ATTORNEY May 18, 1965 A. D. BARNETT ETAL 3,184,040
TAKE-OFF MACHINES
Filed Jan. 7, 1963 3 Sheets-Sheet 3
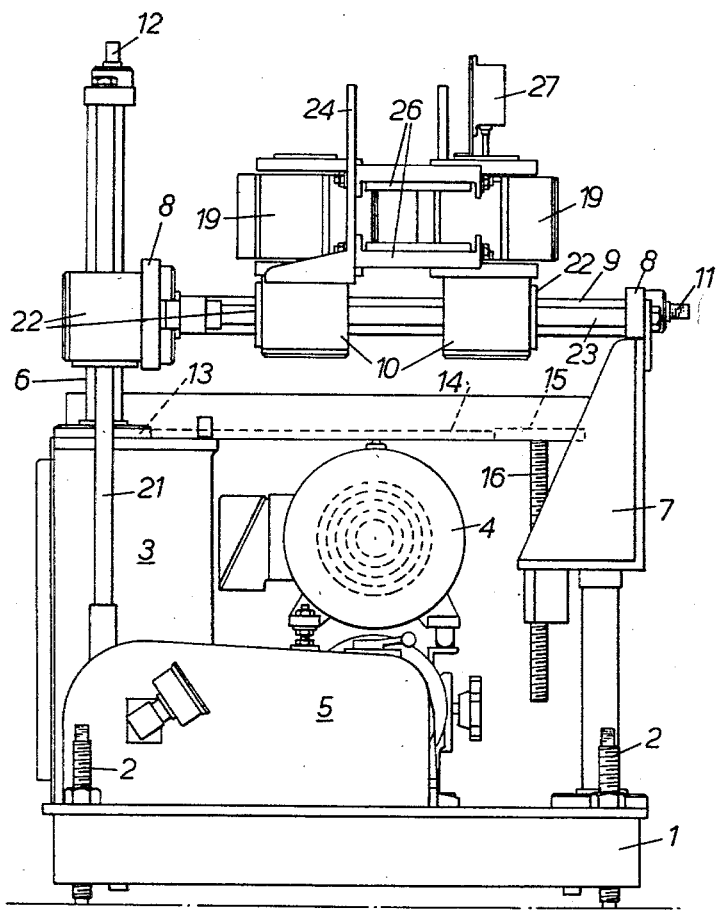
—FIG. 3.—
INVENTOR:
ALVIN DEXTER BARNETT
BY
Abraham A. Saffily
ATTORNEY

3,184,040
TAKE-OFF MACHINES
Alvin Dexter Barnett, 12 Firsway, Wightwick, Wolverhampton, England
Filed Jan. 7, 1963, Ser. No. 249,893
Claims priority, application Great Britain, May 12, 1962, 18,339/62
2 Claims. (Cl. 198—165)

The invention relates to take-off or haul-off machines for supporting and conveying any suitable material, article or workpiece from one station to another, as, for example, in receiving molded manufactured materials such as thermoplastic or thermosetting plastics as these materials move during extruding from dies or formers.

An object of the invention is to provide a new improved construction of take-off machine capable of being quickly and accurately adjusted relative to the diameter or thickness of a workpiece or extrudate and which can furthermore be oriented both horizontally and transversely according to manufacturing requirements, thus rendering the machine multi-positional and the speed of take-off being infinitely variable.

Other features of the invention will be made apparent in the ensuing description where is set forth the preferred embodiment by way of example.

According to the invention the take-off or haul-off machine includes a pair of endless belts adapted to rotate in a horizontal plane providing vertical faces between which the material to be handled is traversed. The endless belts are clad with equidistant elastic or resilient pads and the belts being vertically arranged so that their surfaces act purely for hauling the material.

In order that the invention may be fully and clearly comprehended the same will now be described with reference to and by the aid of the accompanying drawings, wherein:

FIGURE 2 is a plan view of FIGURE 1.

FIGURE 3 is a side view of FIGURE 1.

Figure 1:
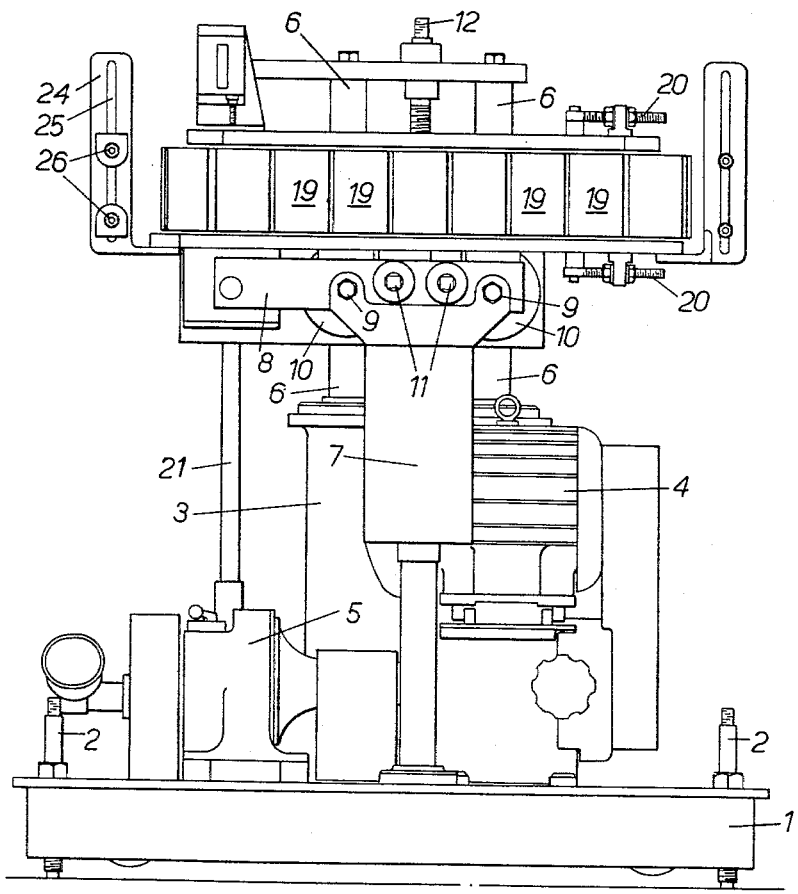
FIGURE 1 is a front elevation of the machine constructed in accordance with the invention.

Refering to the drawings, a box platform 1 is furnished with manually adjustable levelling means 2 and mounted upon the platform is a vertical pedestal 3, of predetermined height, an electromotor or other suitable power unit 4, gearbox and control mechanism 5. At the rear of the platform there is attached a pair of spaced parallel vertical vertical guides 6 and at the front of the platform there is located a perpendicular telescope pillar 7.

Slidably mounted upon the aforesaid guides 6 and upon the front pillar 7 are two cross-heads 8 interconnected by transverse guide shafts 9 upon which shafts 9 there are mounted two longitudinally arranged saddles 10 capable of being traversed towards or away from each other on the guide shaft 9. The traversing motion may be effected in any suitable manner, for instance, by a manually-operated right-and-left screw-threaded shaft and nuts mechanisms 11.

Vertical rising and falling motion can also be imparted to the cross-heads 8 and saddles 10 by any suitable means. one effective method is to associate a manually operated screw-threaded vertical shaft 12 with the rear cross-head 8 upon which shaft there is mounted a sprocket indicated at 13 (FIGURE 3) adapted to drive by an endless chain 14 a similar sprocket 15 mounted upon a screw-threaded vertical shaft 16 (FIGURE 3) associated with the front pillar 7.

Each of the aforesaid saddles 10 mounts a pair of spaced vertical shafts 17 and each pair of shafts carries a longitudinal endless belt 18 set on end. The belts 18 are clad with equidistantly spaced elastic pads 19, are preferably supported throughout their lengths and may have tension-adjustment means 20 associated therewith.

A variable drive shaft 21 connects the gear box 5 to the vertical shafts 17 of the endless belts 18 and thus to the belts by means of appropriate mitre gear boxes 22 on the saddles 10 receiving motion from a transverse shaft 23 driven by the vertical shaft 21 coupled to the motor 4.

The rear saddle 10 carrier a vertically slotted bracket 24 in which slot 25 there are adjustably secured two freely mounted transverse feed rollers 26 arranged in close proximity to the inlet end of the endless belts 18. A similar bracket may be provided at the other end.

In operation, extrudate from the dies of an adjacent machine (not shown) is horizontally passed between the feed rollers 26 and then between the inner spans of the endless belts 18 which have been adjusted both vertically and transversely by manipulation of the related adjusting means.

Upon the machine being started the endless belts 18 (which are purely for hauling) take off or convey the extrudate, such as cable, by the equal frictional grip of the two sets of elastic pads 19 moving unidirectionally and because the belts are vertical or set on end the belts do not take the full force of cable abrasion.

It must be understood that instead of manual adjustment of the belts and of the cross-heads, power-operated adjusting means could be provided. Furthermore, measuring means 27 could be included in the machine for registering either the speed or quantity of extrudate. Also, if desired two or more sets of endless belts could be ganged in alignment and suitably driven.

I claim:

1. A machine for supporting and conveying extruded material issuing continuously from a die or former comprising in combination, a manually adjustable platform, a vertical pedestal mounted on said platform, an electric motor and gear box mounted on said platform, a pair of spaced parallel vertical guides mounted at the rear of said platform, a vertical telescopic pillar mounted at the front of said platform, a cross-head slidably mounted on each guide and upon the front pillar, transverse guide shafts interconnecting the two cross-heads, a slidable saddle on each guide shaft, a manually operable screw-threaded shaft and nut mechanism to impart a traversing motion to both of said slidable saddles on said guide shafts, a pair of manually adjustable and manually operated spaced vertical shafts on each saddle, a driven sprocket mounted upon said vertical shaft coacting with each cross-head, each pair of vertical shafts carrying an endless belt adapted to drive said driven sprocket, drive means including a driving sprocket for said endless belt which is driven from said electric motor to each of the endless belts for each of the vertical shafts and associated driven sprockets, equidistantly spaced pairs of elastic pads on said endless belts for frictionally gripping the conveyed extruded material, means for adjusting the cross-heads in a vertical position to adapt the take-off operation to different thicknesses of the extruded material, means to adjust the saddles in a horizontal position to manipulate the extruded material to the pads and save wear on the belts which are vertically arranged.

2. A machine acording to claim 1, including a pair of feed rollers transversely mounted in a bracket attached to the inlet end of the endless belts.

References Cited by the Examiner
UNITED STATES PATENTS 2,092,916  9/37  Hildebrand _____ 198—162 X
2,421,515  6/47  McNamara _____ 198—165

SAMUEL F. COLEMAN, *Primary Examiner.*
ERNEST A. FALLER, JR., *Examiner.*